US007864203B1

(12) United States Patent
Fear et al.

(10) Patent No.: US 7,864,203 B1
(45) Date of Patent: Jan. 4, 2011

(54) SYSTEM, METHOD AND COMPUTER PROGRAM PRODUCT FOR ADJUSTING A DISPLAY DEVICE VIEWING EXPERIENCE

(75) Inventors: Andrew C. Fear, Campbell, CA (US); Jennifer R. Ramos, Danville, CA (US); David Lee Eng, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 541 days.

(21) Appl. No.: 11/224,766

(22) Filed: Sep. 13, 2005

(51) Int. Cl.
*G09G 5/02* (2006.01)
*G06T 17/00* (2006.01)
*G06F 3/00* (2006.01)

(52) U.S. Cl. ......................... 345/698; 725/37; 715/718; 345/428

(58) Field of Classification Search ................. 345/204, 345/698, 699, 428; 725/37-61; 715/718, 715/744-746; 348/181
See application file for complete search history.

(56) References Cited

U.S. PATENT DOCUMENTS 7,262,784 B2 * 8/2007 Wang ......................... 345/699
2004/0117358 A1 * 6/2004 von Kaenel et al. ............ 707/3
2005/0068346 A1 * 3/2005 Ogawa et al. ............... 345/699
2006/0012616 A1 * 1/2006 Paek .......................... 345/698
2007/0002142 A1 * 1/2007 Lim ........................... 348/181

OTHER PUBLICATIONS www.computerhope.com definitions of h-sync and v-sync published in 2001 per the web archive (web.archive.org).*
"Vesa Standard Summaries" http://www.vesa.org/Standards/summaries.htm.
"Advanced Timing and CEA/EIA-861B Timings" http://www.nvidia.com/object/advanced_timings.html.

* cited by examiner

*Primary Examiner*—Amr Awad
*Assistant Examiner*—Liliana Cerullo
(74) *Attorney, Agent, or Firm*—Zilka-Kotab, PC

(57) ABSTRACT

A system, method, and computer program product are provided for adjusting a viewing experience associated with a display device. During use, a user interface capable of being used for adjusting the viewing experience associated with the display device is automatically displayed, in response to an event that potentially affects the viewing experience associated with the display device.

6 Claims, 6 Drawing Sheets

SYSTEM, METHOD AND COMPUTER PROGRAM PRODUCT FOR ADJUSTING A DISPLAY DEVICE VIEWING EXPERIENCE

FIELD OF THE INVENTION

The present invention relates to display devices, and more particularly to calibrating display images displayed on display devices.

BACKGROUND

Recently, many high-definition television (HDTV) displays have come to market with support for HDTV using standard television-type timings [e.g. Consumer Electronics Association (CEA)-861B, etc.] for providing standard resolution and refresh rates that are commonly used by consumer electronic devices. In contrast, general computers are typically equipped with computer monitor-type timings [e.g. Video Electronics Standards Association (VESA), etc.].

While computer monitor-type timings typically depict display images directly to the edge of the associated computer monitor screen bezel, standard television-type timings conventionally "over-scan" and cut off peripheral information. Such over-scanning and related side effects are typically acceptable in standard television (e.g. HDTV) environments, since such hidden/discarded information usually includes Line 21 information, sub-picture streaming data, metadata, etc which is not visible.

However, when a computer system is used to drive a television supporting television-type timings, a display image (e.g. operating system interface, etc.) is typically only partially depicted. This may be particularly problematic in a situation where operating system interface controls (e.g. a start icon, etc.) are situated adjacent to a periphery of the display image, which is cut off.

While operating system and software-controlled display device parameters may be adjusted for correcting the forgoing over-scan problem, it is often difficult for the user to identify the necessary user interface for facilitating such correction. Worse yet, such user interface may not even be accessible due to the aforementioned hidden operating system interface controls, etc.

There is thus a need for overcoming these and/or other problems associated with various events that degrade a viewing experience associated with a display device.

SUMMARY

A system, method, and computer program product are provided for adjusting a viewing experience associated with a display device. During use, a user interface capable of being used for adjusting the viewing experience associated with the display device is automatically displayed, in response to an event that potentially affects the viewing experience associated with the display device. In one optional embodiment, the viewing experience may be adjusted via remote control.

BRIEF DESCRIPTION OF THE DRAWINGS

FIGS. 3B-1 illustrates another user interface for adjusting a viewing experience associated with a display device, in accordance with another embodiment which utilizes slider bars for adjustment purposes.

FIGS. 3B-2 illustrates a user interface similar to that of FIGS. 3B-1, after the slider bars have been used to adjust the viewing experience associated with the display device.

DETAILED DESCRIPTION

Figure 1:
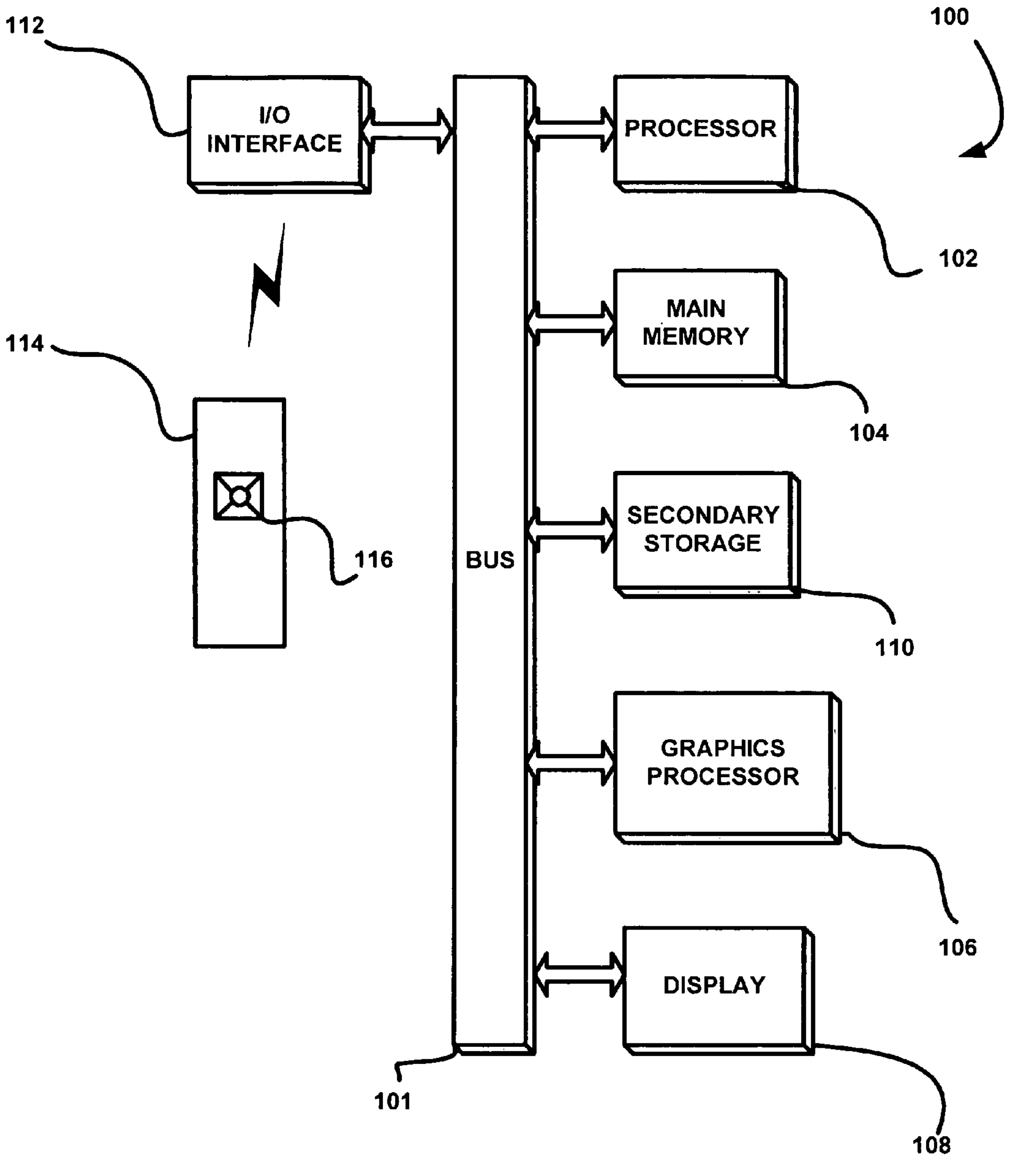
FIG. 1 illustrates an exemplary computer, in accordance with one embodiment.

FIG. 1 illustrates an exemplary computer 100, in accordance with one embodiment. As shown, the computer 100 is provided including at least one processor 102 which is connected to a communication bus 101. The computer 100 also includes a main memory 104. Control code (software) and data are stored in the main memory 104 which may take the form of random access memory (RAM), read-only memory (ROM), and/or any other desired memory capable of storage.

The computer 100 also includes a graphics processor 106 and a display device 108. In one embodiment, the graphics processor 106 may include a transform module, a lighting module, and a rasterization module. Each of the foregoing modules may even be situated on a single semiconductor platform to form a graphics processing unit (GPU), as an option.

Further, the display device 108 may either be integral with or separate from the remaining components disclosed herein. While the display device 108 is shown to be in direct communication with the remaining illustrated components via a communication bus 101 (without a network, etc. therebetween), it should be noted that, in other embodiments, the display device 108 may remain in communication with the remaining components via any desired network [e.g. a local area network (LAN), Ethernet, the Internet, etc.]. This may, for example, be accomplished utilizing a digital media adapter (DMA), or any other desired device. In one embodiment, the display device 108 may include a high-definition television (HDTV). Of course, other display devices 108 are contemplated such as computer monitors, low-definition television, liquid crystal displays (LCDs), plasma displays, projectors, and/or any other device capable of displaying output.

The computer 100 may also include a secondary storage 110. The secondary storage 110 includes, for example, a hard disk drive and/or a removable storage drive, representing a floppy disk drive, a magnetic tape drive, a compact disk drive, a digital video disk (DVD) drive, etc. The removable storage drive reads from and/or writes to a removable storage unit in a well known manner.

For reasons that will soon become apparent, an input/output (I/O) interface 112 may further communicate with the bus 101 for providing communication with any desired I/O device. For example, the I/O interface 112 may permit communication with a remote control 114. In use, the remote control 114 may be adapted for providing input signals to the remaining components via the I/O interface 112 and bus 101. For example, in an embodiment where a media remote control 114 is provided, the remote control 114 may be equipped with keys 116 including a plurality of directional keys and a select key for reasons that will soon become apparent.

While not shown, a network adapter (not shown) may be coupled to the remaining components via the bus 101. In use, such network adapter may be capable of facilitating communication via a network. Such network, for example, may include a telecommunications network, a local area network (LAN), a wireless network, a wide area network (WAN) such as the Internet, or any type of network for that matter.

Computer programs, or computer code, may be stored in the main memory 104 and/or the secondary storage 110. Such computer programs, when executed, enable the computer 100 to perform various functions. Memory 104, storage 110 and/or any other storage are possible examples of computer-readable media.

In various embodiments, the computer 100 may take the form of a circuit board system, a game console system dedicated for entertainment purposes, a desktop computer, a laptop computer, a hand-held computer, a personal video recorder (PVR), a home entertainment system, an application-specific system, and/or any other desired system for that matter.

Figure 2:
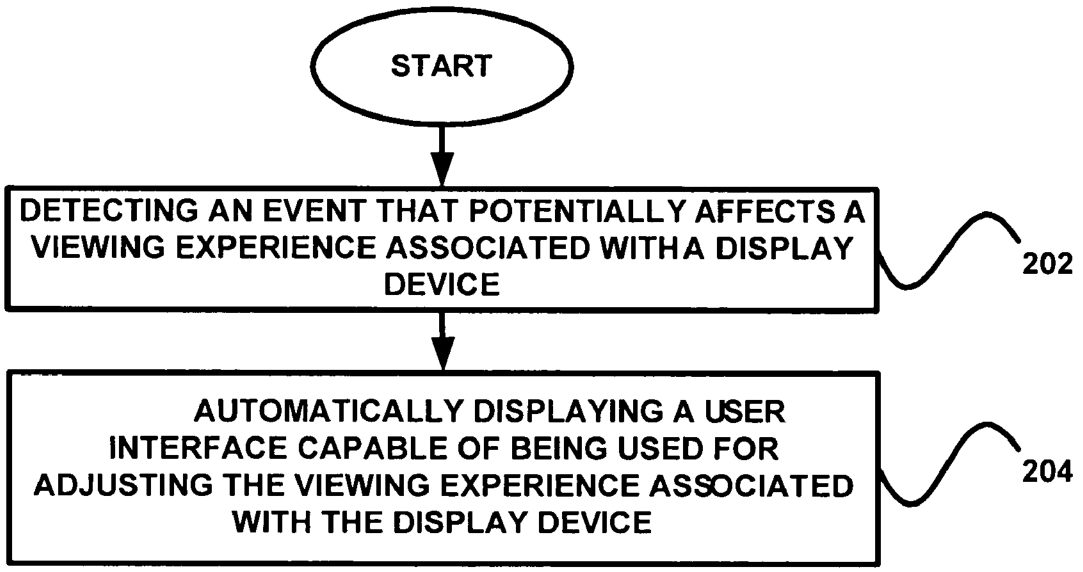
FIG. 2 shows a method for adjusting a viewing experience associated with a display device, in accordance with one embodiment.

FIG. 2 shows a method 200 for adjusting a viewing experience associated with a display device, in accordance with one embodiment. As an option, the present method 200 may be implemented in the context of the architecture and environment of FIG. 1. For example, the present method 200 may be carried out by computer code executed utilizing the processor 102 of FIG. 1. Of course, however, the method 200 may be implemented in any desired environment.

In operation 202, an event that potentially affects a viewing experience associated with a display device (e.g. see, for example, the display device 108 of FIG. 1, etc.) is detected. In the context of the present description, such viewing experience may include any aspect associated with the display device that is perceptible by a human user. Just by way of example, the viewing experience may involve a visibility, size, brightness, contrast, resolution, position, color, horizontal/vertical shifting, sharpness, scaling, phase, and/or any other aspect associated with display device.

Further in the context of the present description, the event may include any event that degrades the viewing experience associated with the display device. For example, the event may include a first boot-up of an operating system, which may result in various operating system interface controls being inaccessible. This inaccessibility may occur when an HDTV (which typically displays a display image utilizing a particular timing) is connected to a computer (which typically displays a display image on a display device utilizing a different timing). As mentioned earlier, such difference in timing may result in a portion of the display image being cut off using the HDTV. Thus, in the present example, the relevant aspect of the viewing experience that is degraded may include the visibility of the resultant display image.

As yet another example, the event may include a first communication with the display device (even after a first boot-up of an associated operating system), etc. Such first communication with the display device may occur when a display device is used for the first time (i.e. when a new display device is purchased for a computer, etc.).

Still yet, the present event may occur when a user toggles the display device out so that the display image is depicted utilizing a different display device. For example, this may happen in a dual-display environment such as when a user utilizes a computer (e.g. laptop, etc.) to drive a projector or the like. Of course, in the present example, any event is contemplated where the optimal resolution of the display device is different than a default setting. Thus, in the present embodiment, the relevant aspect of the viewing experience that is degraded may include the resolution of the resultant display image.

Again, the present examples are set forth for illustrative purposes only and should not be construed as limiting in any manner, as the event may include any event that degrades a viewing experience associated with the display device.

In response to the foregoing event that potentially affects the viewing experience associated with the display device, a user interface is automatically displayed. Note operation 204. Such user interface is capable of being used for adjusting the viewing experience associated with the display device. In the context of the present description, such adjustment may include any automatic and/or manual adjustment of any aspect (or even multiple aspects) associated with the display device that is perceptible by a human user, for the purpose of optimizing (or even further degrading, if desired) the viewing experience.

It should be noted that any desired hardware and/or software-based technique may be used to automatically display the user interface. In the context of the foregoing example where the event includes a first boot-up of an operating system, an application associated with the user interface may be listed as one of those which are to be automatically executed at the first boot-up of the operating system. To this end, the viewing experience may be immediately adjusted by adjusting the timing of a signal representative of the display image depicted on the display device. More exemplary information regarding such timing adjustment and associated user interface will be set forth in greater detail during reference to subsequent figures.

Further, in the context of the earlier example where the event includes a first communication with the display device, an operating system may monitor any new connection with a display device. Of course, any mechanical and/or software may be utilized for detecting such condition.

Even still, in the context of the example where the event involves a user toggling the display device out, an operating system may detect the selection of a new display device (e.g. projector, etc.). This may be accomplished by monitoring an associated operating system control panel and/or even a mechanical switch or the like situated on a computer keyboard, etc.

Thus, a user may be automatically provided with a user interface capable of being used to remedy a degradation of a viewing experience. More illustrative information will now be set forth regarding various optional features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

FIGS. 3A, 3B-1, and 3B-2 show user interfaces 300A, 300B-1, 300B-2, respectively, for adjusting a viewing experience associated with a display device, in accordance with one embodiment. As an option, the present user interfaces 300A, 300B-1, 300B-2 may be implemented in the context of the architecture and environment of FIGS. 1 and/or 2. For example, the present user interfaces 300A, 300B-1, 300B-2 may be displayed in the context of operation 204 of FIG. 2. Of course, however, the user interfaces 300A, 300B-1, 300B-2 may be implemented in any desired environment.

Further, the following description of the user interfaces 300A, 300B-1, 300B-2 will be set forth in relation to the aforementioned example, where the viewing experience is adjusted by adjusting the timing of a signal representative of the display image depicted on the display device. However, it is contemplated that the various features set forth hereinbelow are equally applicable to the adjustment of other aspects of the viewing experience.

As shown in FIGS. 3A, 3B-1, and 3B-2, each of the user interfaces 300A, 300B-1, 300B-2 is equipped with a pair of adjustment icons 302A, 304A, 302B-1, 304B-1, 302B-2, 304B-2. In the user interface 300A of FIG. 3A, the adjustment icons 302A, 304A may be used to adjust the timing of the signal representative of the display image depicted on the display device. Using the adjustment icon 304A, such adjusting may result in the insertion of a plurality of pixels 310A (e.g. black area, etc.) along a border of the display image. Of course, if too many of the pixels 310A are inserted, some may be removed using the adjustment icon 302A. To this end, a visibility of the display image may be increased by depicting a border of the display image within a bezel of the display device.

Figure 3A:
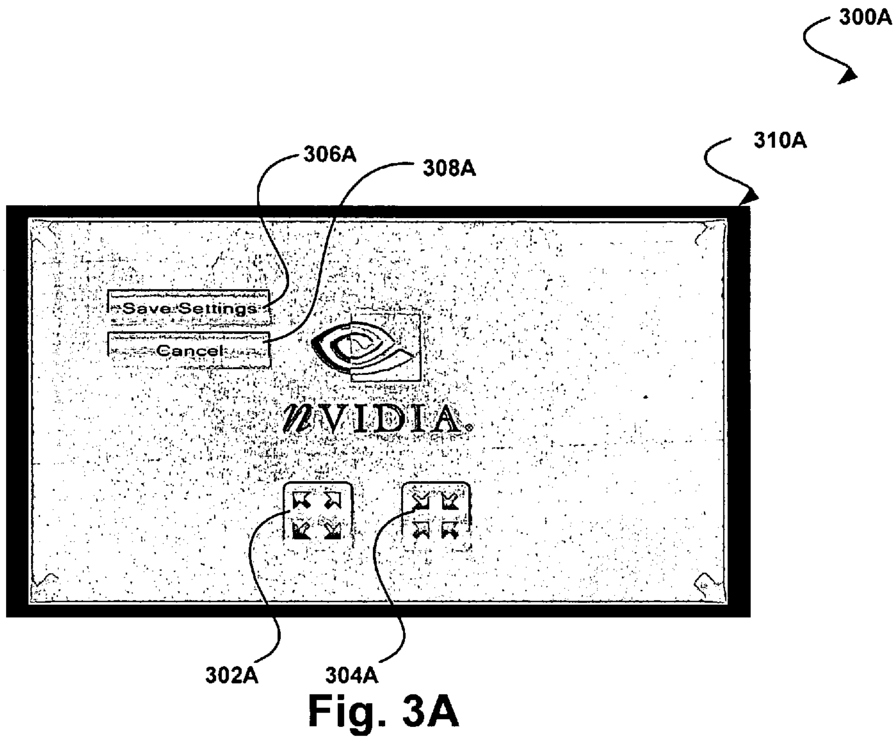
FIG. 3A illustrates a user interface for adjusting a viewing experience associated with a display device, in accordance with one embodiment.
Figures 1, 3B:
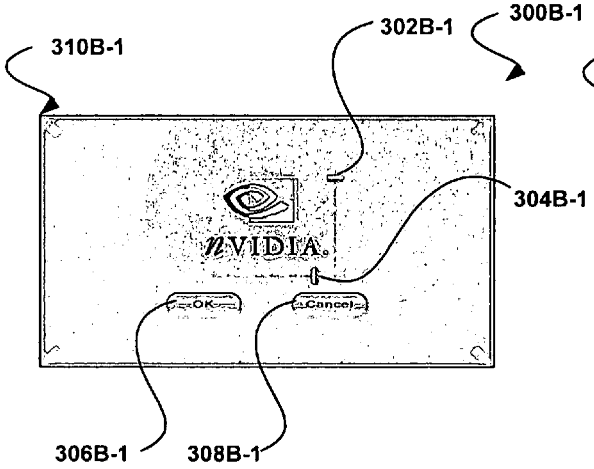
Figures 2, 3B:
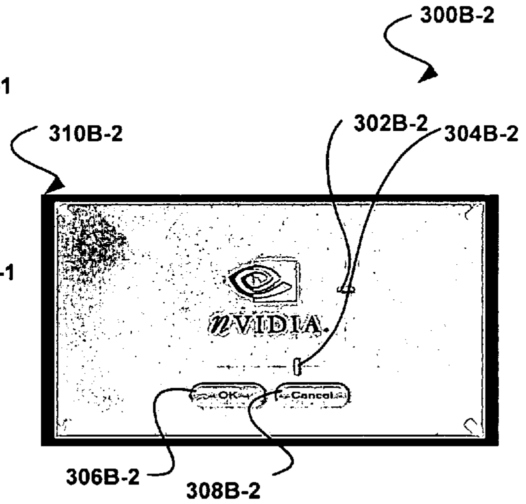

Similarly, in the user interfaces 300B-1, 300B-2 of FIGS. 3B-1 and 3B-2, the adjustment icons 302B-1, 302B-2, 304B-1, 304B-2 may also be used to adjust the timing of the signal representative of the display image depicted on the display device. However, using the adjustment icons 302B-1, 302B-2, such adjusting may result in the insertion of a plurality of pixels 310B-1, 310B-2 along an upper and lower border of the display image by sliding the bar down (to insert pixels) and up (to remove pixels). Further, using the adjustment icons 304B-1, 304B-2, the adjusting may result in the insertion of a plurality of pixels 310B-1, 310B-2 along a left and right border of the display image by sliding the bar left (to insert pixels) and right (to remove pixels).

Once a desired adjustment has been obtained, a save icon 306A, 306B-1, 306B-2 may be selected to make the adjusted viewing experience permanent (at least until further adjustment). On the other hand, if at any time the user wishes to cancel any adjustment, a cancel icon 308A, 308B-1, 308B-2 may be selected.

In use, each of the user interfaces 300A, 300B-1, 300B-2 may be displayed in a full-screen size. This may be accomplished by utilizing a network browser (e.g. MS EXPLORER, etc.) via a self-contained application (e.g. JAVA, XML, etc.), and/or any other desired programming technique. By this design, the user interfaces 300A, 300B-1, 300B-2 may be operating system platform-independent, and a user may be provided with instant feedback on the adjusting, by displaying the adjusting. This feature is readily apparent by comparing the user interfaces 300B-1, 300B-2 of FIGS. 3B-1 and 3B-2, whereby a user may monitor and fine tune the adjustment of the timing in real-time. For example, a user may adjust the user interface until the corner arrows thereof are visible and further substantially coincide with corner edges of the visible screen, with possibly a small amount of pixels therebetween.

As an option, the viewing experience may be capable of being adjusted via remote control (e.g. see, for example, the remote control 114 of FIG. 1, etc.). As mentioned previously, the remote 114 may be equipped with a plurality of directional/select keys 116. In such embodiment, a user may move a cursor among the different icons using the directional keys of the remote control and the select key may be used to select the particular key on which the cursor currently resides. In the case of the slider bars of FIGS. 3B-1 and 3B-2, selection of the same may allow the user to move them using the directional keys. Thus, in the current embodiment, a media remote control may be conveniently used to adjust the viewing experience utilizing the user interface.

Figure 4:
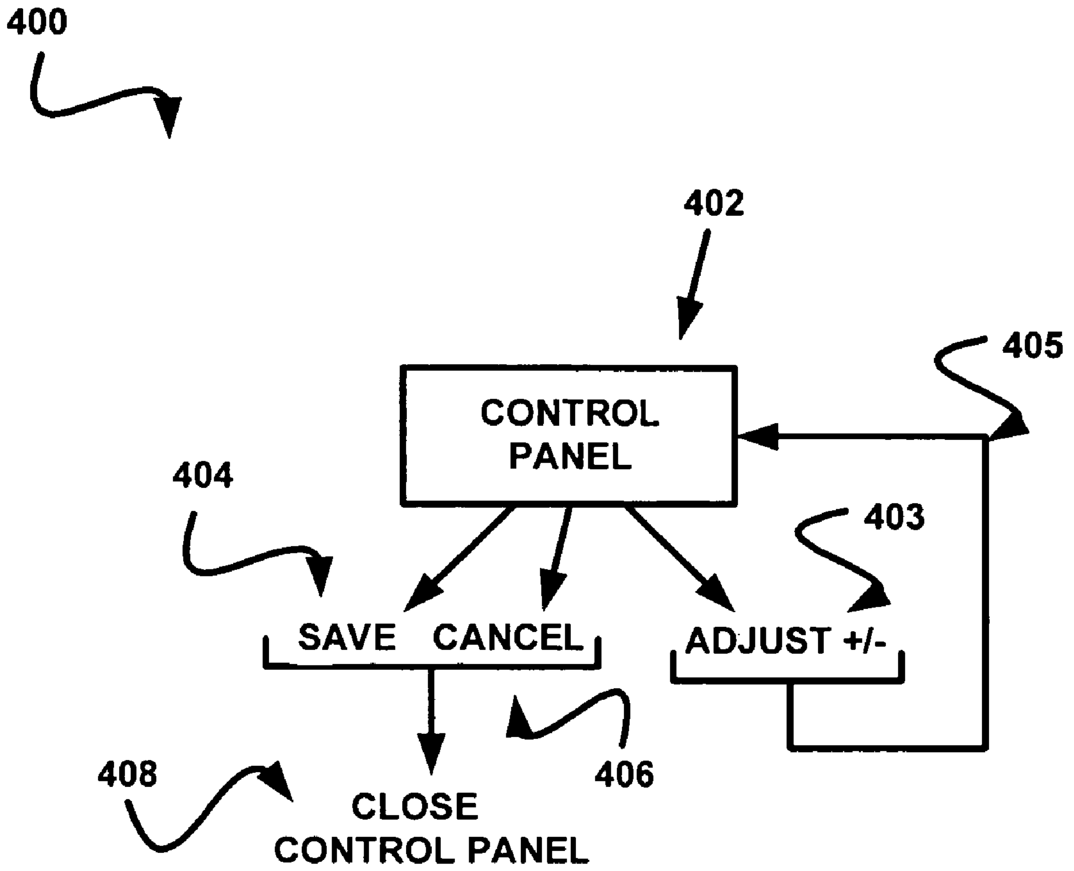
FIG. 4 is a flow diagram of a method for adjusting a viewing experience associated with a display device utilizing a user interface, in accordance with one embodiment.

FIG. 4 shows a method 400 for adjusting a viewing experience associated with a display device utilizing a user interface, in accordance with one embodiment. As an option, the present method 400 may be implemented in the context of the architecture and environment of FIGS. 1-3B-2. For example, the present method 400 may be carried out in the context of the user interfaces 300A, 300B-1, 300B-2 of FIGS. 3A, 3B-1, and 3B-2, respectively. Of course, however, the method 400 may be implemented in any desired environment.

As shown, a control panel (e.g. see, for example, the user interfaces 300A, 300B-1, 300B-2 of FIGS. 3A, 3B-1, and 3B-2, etc.) is displayed. Note operation 402. After the control panel is displayed, adjustment of the viewing experience is permitted in operation 403 via any desired mechanism (e.g. see, for example, the adjustment icons 302A, 304A, 302B-1, 304B-1, 302B-2, 304B-2 of FIGS. 3A, 3B-1, and 3B-2, etc.). Such adjustment may be repeated as necessary, as noted by loop 405.

After a user is satisfied or dissatisfied with a current state of the adjustment, a save operation 404 or cancel operation 406 may be initiated for either saving or canceling any previous adjustments. Thereafter, the control panel is closed. See operation 408.

Figure 5:
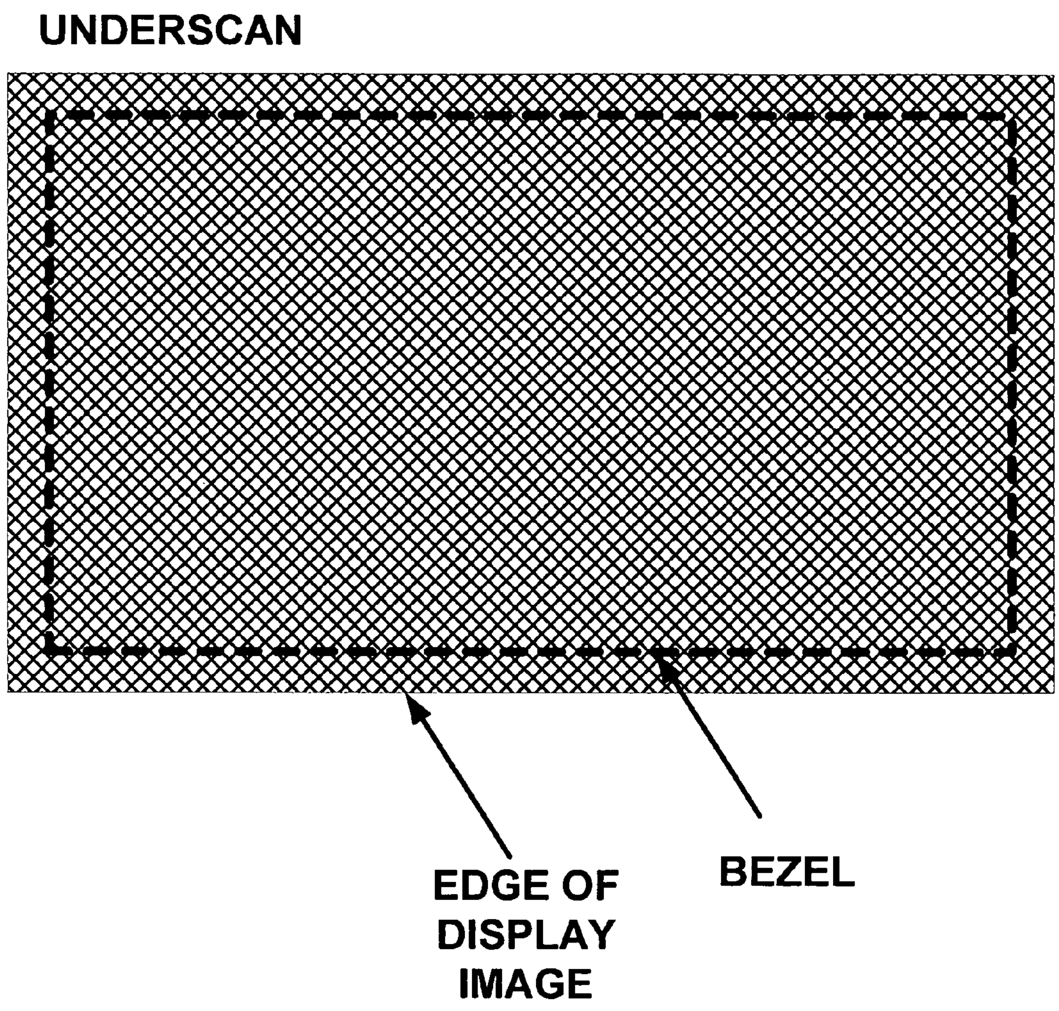
FIG. 5 shows a display image with a portion thereof between cut off due to the fact that the under-scanned display image extends beyond a bezel of the display device, in accordance with one embodiment
Figure 6:
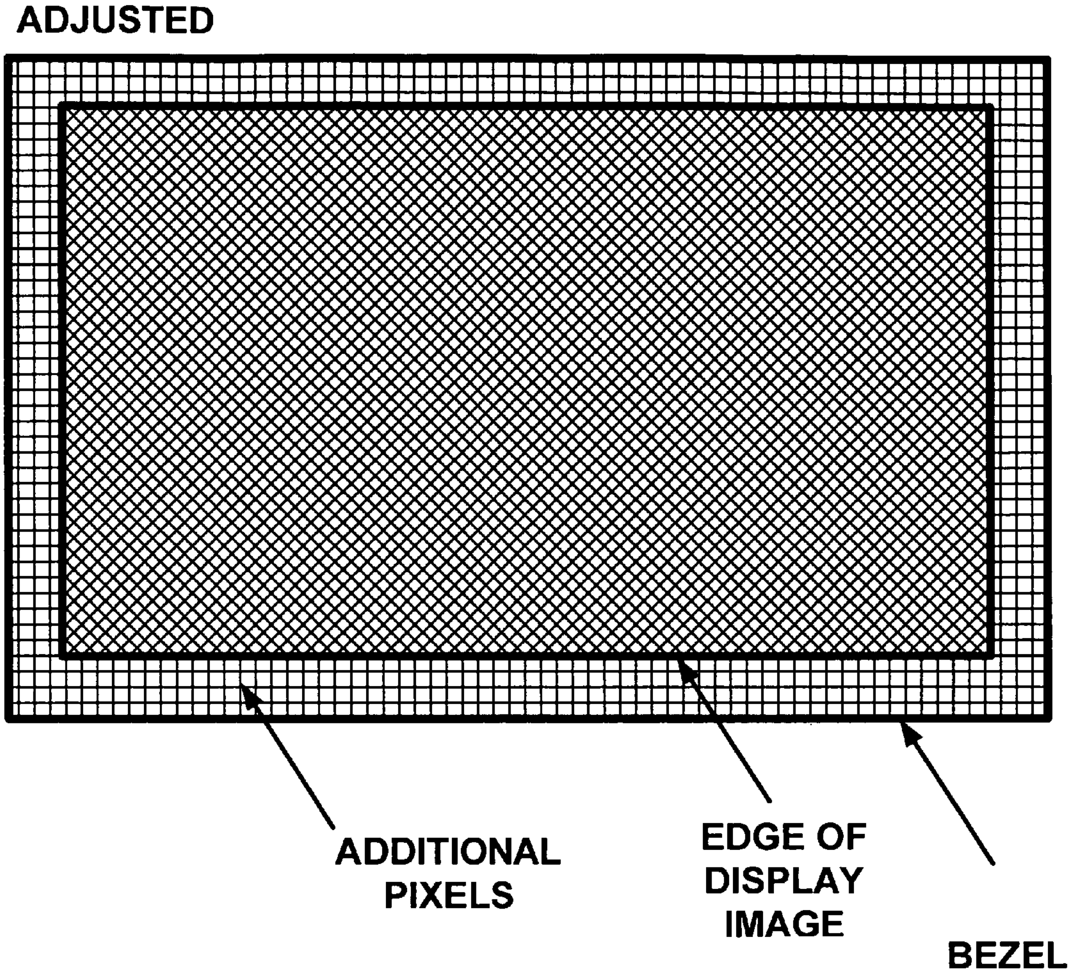
FIG. 6 shows the display image of FIG. 5 with the previously cut off portion now visible, by adjusting a timing associated with the display image so that additional pixels reside between the bezel and an edge of the display image.

FIGS. 5-6 show a display image before and after adjustment of the viewing experience, for illustrating the manner in which a visibility of the display image is increased. Specifically, FIG. 5 shows a display image with a portion thereof being cut off due to the fact that the under-scanned display image extends beyond a bezel of the display device. Further, FIG. 6 shows the display image of FIG. 5 with the previously cut off portion now visible, by adjusting a timing associated with the display image so that additional pixels reside between the bezel and an edge of the display image.

Thus, an under-scan amount may be selected when connecting, for example, an HDTV to a computer via a component Y, Pr, Pb, and DVI, in order to insert a black area around a border of a display image. This may, in turn, force operating system controls (e.g. MS WINDOWS desktop, etc.) to be viewable. For instance, if a CEA-861B timing of 720 p is selected (with 0% under-scan), there may be an area cut off by a display device bezel. At 7% under-scan, about 90 black pixels may be inserted on the left and right edge of the display image, and 50 black pixels may be inserted on the top and bottom of the display image. This, in turn, causes the operating system interface to appear to shrink in size and fit within the display device bezel.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:

in automatic response to an event that potentially affects a viewing experience associated with a display device:

automatically displaying a user interface capable of being used for adjusting the viewing experience associated with the display device;

wherein the viewing experience is adjusted by adjusting a timing of a signal representative of a display image displayed on the display device;

wherein the timing is adjusted manually by manipulating a set of adjustment icons provided on the user interface and selecting a save icon provided on the user interface operable to save the adjustment of the viewing experience;

wherein the adjusting results in an insertion of a plurality of pixels along a border of the display image, and the user interface is adjusted until corner arrows of the user interface, separate from the set of adjustment icons, are visible and coincide with corner edges of a visible screen of the display device, wherein the set of adjustment icons includes a set of slider bars and timing is adjusted manually by manipulating the set of slider bars, such that insertion of a plurality of pixels along an upper and lower border of the display image occurs in response to sliding a first one of the slider bars in a first direction, and insertion of a plurality of pixels along a left and right border of the display image occurs in response to sliding a second one of the slider bars in a second direction.

2. The method of claim 1, wherein a visibility of the display image is increased by depicting the border of the display image within a bezel of the display device.

3. The method of claim 2, wherein the border includes a left border and a right border.

4. The method of claim 1, wherein an under-scan amount is selected in order to insert a black area around the border of the display image.

5. The method of claim 4, wherein at an under-scan amount of 7%, 90 black pixels are inserted on a left and right edge of the display image, and 50 black pixels are inserted on a top and bottom of the display image.

6. A computer program product embodied on a tangible computer readable medium, comprising:

computer code for automatically displaying a user interface capable of being used for adjusting a viewing experience associated with a display device, in automatic response to an event that potentially affects the viewing experience associated with the display device;

wherein the computer program product is operable such that the viewing experience is adjusted by adjusting a timing of a signal representative of a display image displayed on the display device;

wherein the computer program product is operable such that the timing is adjusted manually by manipulating a set of adjustment icons provided on the user interface and selecting a save icon provided on the user interface operable to save the adjustment of the viewing experience;

wherein the computer program product is operable such that the adjusting results in an insertion of a plurality of pixels along a border of the display image, and the user interface is adjusted until corner arrows of the user interface, separate from the set of adjustment icons, are visible and coincide with corner edges of a visible screen of the display device, wherein the set of adjustment icons includes a set of slider bars and timing is adjusted manually by manipulating the set of slider bars, such that insertion of a plurality of pixels along an upper and lower border of the display image occurs in response to sliding a first one of the slider bars in a first direction, and insertion of a plurality of pixels along a left and right border of the display image occurs in response to sliding a second one of the slider bars in a second direction.

* * * * *